United States Patent
Dong et al.

(10) Patent No.: US 10,436,272 B2
(45) Date of Patent: Oct. 8, 2019

(54) FRICTION MATERIAL

(71) Applicant: BorgWarner Inc., Auburn Hills, MI (US)

(72) Inventors: Feng Dong, Rochester, MI (US); Wanjun Liu, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 179 days.

(21) Appl. No.: 15/649,006

(22) Filed: Jul. 13, 2017

(65) Prior Publication Data

US 2018/0017122 A1  Jan. 18, 2018

Related U.S. Application Data

(60) Provisional application No. 62/362,906, filed on Jul. 15, 2016.

(51) Int. Cl.
*F16D 69/02* (2006.01)
*F16D 13/60* (2006.01)
*F16D 13/74* (2006.01)
*F16D 69/00* (2006.01)

(52) U.S. Cl.
CPC ........... *F16D 69/028* (2013.01); *F16D 13/60* (2013.01); *F16D 69/026* (2013.01); *F16D 13/74* (2013.01); *F16D 2069/002* (2013.01); *F16D 2069/005* (2013.01); *F16D 2069/007* (2013.01); *F16D 2200/0065* (2013.01); *F16D 2200/0069* (2013.01)

(58) Field of Classification Search
CPC .............................. F16D 69/026; F16D 69/028
See application file for complete search history.

(56) References Cited

U.S. PATENT DOCUMENTS

| 4,718,910 | A | 1/1988 | Draenert |
| 6,521,339 | B1 | 2/2003 | Hansen et al. |
| 7,429,418 | B2 * | 9/2008 | Lam ................. B82Y 30/00 428/311.11 |
| 2003/0094252 | A1 | 5/2003 | Sundar et al. |

(Continued)

FOREIGN PATENT DOCUMENTS

WO    WO 2014026998 A1    2/2014

OTHER PUBLICATIONS

ASTM International, "Standard Test Method for Determination of Pore Volume and Pore Volume Distribution of Soil and Rock by Mercury Intrusion Porosimetry", Designation D4404-10, 2016, pp. 1-7.

(Continued)

*Primary Examiner* — Vickey Nerangis
(74) *Attorney, Agent, or Firm* — Howard & Howard Attorneys PLLC (57) ABSTRACT

A friction material comprises a base and a porous friction generating layer penetrating into and integral with the base. The base presents a bonding surface. The porous friction generating layer presents a friction generating surface facing opposite the bonding surface of the base. The porous friction generating layer comprises fibers and friction adjusting particles, and about 30 to about 95% of a total surface area of the fibers is in contact with the friction adjusting particles. A curable resin is dispersed throughout the porous friction generating layer and the base.

14 Claims, 5 Drawing Sheets

(56) References Cited

U.S. PATENT DOCUMENTS

| | | | |
|---|---|---|---|
| 2006/0008635 A1* | 1/2006 | Dong | F16D 69/026 |
| | | | 428/304.4 |
| 2006/0009541 A1 | 1/2006 | Chen et al. | |
| 2006/0019080 A1 | 1/2006 | Lam et al. | |
| 2009/0107645 A1 | 4/2009 | Legnerfalt et al. | |
| 2010/0144228 A1 | 6/2010 | Branham et al. | |
| 2013/0037373 A1* | 2/2013 | Dong | F16D 69/026 |
| | | | 192/107 M |

OTHER PUBLICATIONS

Kondo, Yuriko et al., "Tribological Properties of Ionic Liquids", 2013, pp. 127-141.
Monge, R. et al., "Ionic Liquids as an Additive in Fully Formulated Wind Turbine Gearbox Oils", Wear 328-329, 2015, pp. 50-63.
Somers, Anthony E. et al., "A Review of Ionic Liquid Lubricants", Lubricants, 1, 2013, pp. 3-21.
Xu et al., "Effect of Kidney-Type and Circular Cross Sections on Carbon Fiber Surface and Composite Interface", Composites: Part A 39, 2008, pp. 301-307.

\* cited by examiner

FRICTION MATERIAL

CROSS-REFERENCE TO RELATED APPLICATIONS

This application claims priority to and all the advantages of U.S. Provisional Patent Application No. 62/362,906, filed on Jul. 15, 2016, the content of which is incorporated herein by reference.

FIELD OF THE DISCLOSURE

The subject disclosure generally relates to a friction material comprising a base and an indiscreet friction generating layer. More specifically, the subject disclosure relates to a friction material which can be used in a friction plate in a clutch assembly in a transmission.

DESCRIPTION OF THE RELATED ART

Several components of a motor vehicle powertrain may employ a wet clutch to facilitate the transfer of power from the vehicle's power generator (i.e. an internal combustion engine, electric motor, fuel cell, etc.) to the drive wheels. A transmission which is located downstream from the power generator and which enables vehicle launch, gear shifting, and other torque transfer events is one such component. Some form of a wet clutch may be found throughout many different types of transmissions currently available for motor vehicle operation. A wet clutch may be utilized in a torque converter for an automatic transmission, a multi-plate wet clutch pack for an automatic transmission or a semi-automatic dual-clutch transmission (DCT), and a wet start clutch that may be incorporated into a sportier automatic transmission equipped with as many as seven to nine gears as a substitute for the torque converter, to name but a few exemplary applications. Similar wet clutches may be found elsewhere in the vehicle powertrain besides the transmission.

A wet clutch is an assembly that interlocks two or more opposed, rotating surfaces in the presence of a lubricant by imposing selective interfacial frictional engagement between those surfaces. A friction plate, a band, a synchronizer ring, or some other part that provides one of these engageable rotating surfaces typically supports a friction material to effectuate the intended interlocking frictional engagement. The presence of the lubricant at the friction interface cools and reduces wear of the friction material and permits some initial slip to occur so that torque transfer proceeds gradually, although very quickly, in an effort to avoid the discomfort that may accompany an abrupt torque transfer event (i.e. shift shock).

Conventional friction materials generally do not function reliably in such wet clutch applications, especially the more recent clutch applications such as wet start clutch applications and shifting applications, e.g. semi-automatic DCT applications. Although friction materials having improved coefficient of friction ("COF") have been developed in an attempt to meet the demands of these wet clutch applications, many of the friction materials developed lack the requisite COF and durability due in large part to conventional friction materials having pores which are too small. Friction materials having smaller pore size tend to provide an inconsistent COF over a range of conditions. Further, friction materials having smaller pore size tend to restrict the flow of lubricant through the friction material, this reduced flow causes inadequate cooling, which impacts the performance properties and durability of the friction generating material. As such, the friction materials developed for these wet clutch applications contribute to a variety of complications including lack of sufficient torque transfer, shuddering, shift shock, and poor durability.

Due to the inadequacies of existing friction materials, there remains an opportunity to provide improved performance properties and durability.

SUMMARY OF THE DISCLOSURE AND ADVANTAGES

A friction material comprises a base and a porous friction generating layer penetrating into and integral with the base. The base presents a bonding surface. The porous friction generating layer presents a friction generating surface facing opposite the bonding surface of the base. The porous friction generating layer comprises fibers and friction adjusting particles, and about 30 to about 95% of a total surface area of the fibers is in contact with the friction adjusting particles. A curable resin is dispersed throughout the porous friction generating layer and the base.

Because from about 30 to about 95% of the total surface area of the fibers in the porous friction generating layer are in contact with the friction adjusting particles, the porous friction generating layer has pores of increased size. The increased average pore size of the porous friction generating layer allows for increased lubricant flow through the friction material in wet clutch applications; this increased lubricant flow provides the friction material with improved performance properties.

BRIEF DESCRIPTION OF THE DRAWINGS

Other advantages of the present invention will be readily appreciated, as the same becomes better understood by reference to the following detailed description when considered in connection with the accompanying drawings.

FIGS. 1-6 are exemplary in nature and are not drawn to scale and are, thus, not intended to represent the relative sizes of the various components of the friction material, e.g. the friction generating layer, the base, the friction adjusting particles, the fibers, etc.

DETAILED DESCRIPTION OF THE DISCLOSURE

Referring to the Figures, wherein like numerals indicate corresponding parts throughout the several views, a friction material is shown generally at 10 and a friction plate is shown generally at 30.

The friction material 10 described herein is typically used on a friction plate 30 which is included in a wet clutch assembly in a transmission of a motor vehicle. However, it is to be appreciated that the friction material 10 and friction plate 30 described herein can be used in other vehicular applications and has applications beyond motor vehicles.

Figure 3A:
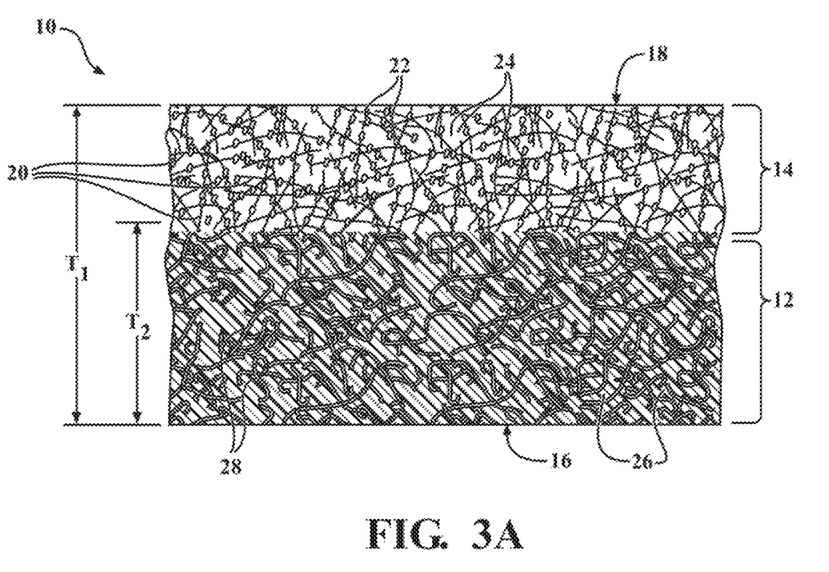
FIG. 3A is an enlarged cross-sectional view of a friction material including a porous friction generating layer and a base.

Referring now to FIG. 3A, the friction material 10 comprises a base 12 and an indiscreet porous friction generating layer 14 penetrating into and integral with the base 12. The base 12 presents a bonding surface 16. The porous friction generating layer 14 presents a friction generating surface 18 facing opposite (and parallel to) the bonding surface 16 of the base 12. A curable resin 26 is dispersed throughout the porous friction generating layer 14 and the base 12 of the friction material 10.

Still referring to FIG. 3A, the friction material 10 has a thickness $T_1$ defined as a distance between the friction generating surface 18 and the bonding surface 16. In various embodiments, the porous friction generating layer 14 extends from the friction generating surface 18 towards the bonding surface 16 up to about 40%, alternatively up to about 30%, alternatively up to about 20%, alternatively up to about 10%, alternatively up to about 5%, of the thickness $T_1$. The base 12 typically has a thickness $T_2$ of less than about 2 mm, alternatively from about 0.3 mm to about 1 mm. If the friction material 10 is about 0.25 mm to about 2 mm thick, which is typical for a friction material 10 applied to a clutch plate (wet clutch) in a transmission, the porous friction generating layer 14 may extend inwards from the friction generating surface 18 to a depth up to about 0.0125 mm (5% of 0.25 mm) to about 0.80 mm (40% of 2 mm).

Referring to FIG. 3A, the porous friction generating layer 14 comprises fibers 20 and friction adjusting particles 22. The arrangement of the fibers 20 and friction adjusting particles 22 defines a plurality of pores 24. The porous friction generating layer 14 may be referred to as indiscrete because the fibers 20 and the friction adjusting particles 22 are applied to, and typically penetrate into, the base 12. Likewise, particles and fibers of the base 12 may penetrate into the porous friction generating layer 14. Accordingly, the porous friction generating layer 14 and the base 12 are integral layers within the friction material 10.

That said, in some embodiments, the base 12 comprises some of or even all of the structural attributes, e.g. particles in contact with fiber, increased pore size, etc., of the friction generating layer 14. In such embodiments, the base 12 can be compositionally the same as, or compositionally different than, the friction generating layer 14, but have the same structural attributes, e.g. particles in contact with fiber, increased pore size, etc., as the friction generating layer 14. In embodiments where the base 12 is the same as the friction generating layer 14, the friction generating material 10 can be referred to as a single layer, mono-layer, or a homogenous friction generating material 10.

The fibers 20 have a total surface area. The total surface area of the fibers 20 is the sum of the individual surface area of each fiber in the porous friction generating layer 14. The friction adjusting particles 22 are in contact with the fibers 20 such that about 30 to about 95, alternatively about 40 to about 90, % of the surface area of the fibers 20 is in contact with the friction adjusting particles 22. An optical imaging instrument such as an optical microscope (e.g. a Nikan Microphat-SA) or scanning electron microscope ("SEM") (e.g. a Jeol JSM-6610LV) can be used to measure the total surface area of the fibers 20 as well as the surface area of the fibers 20 which is in contact with the friction adjusting particles 22. In many embodiments, the % surface area of the fibers 20 that is in contact with the friction adjusting particles 22 ("contact percentage") is the surface area of the fibers 20 which is in contact with the friction adjusting particles 22 divided by the surface area of the fibers 20 multiplied by one hundred.

For example, an SEM or an optical microscope can be used to obtain an image of the fibers 20 and the friction adjusting particles 22 in contact therewith. Imaging software (such as IMAGE-PRO® PLUS software, commercially available from Media Cybernetics, Inc., Rockville, Md.) can be used to determine the surface area of the fibers 20 and the surface area of the fibers 20 which is in contact with the friction adjusting particles 22 (i.e. the surface area of the fibers 20 occupied by the friction adjusting particles 22). The contact percentage is the ratio of the occupied surface area to total surface area of the fibers 20 multiplied by one hundred (converted to a percentage).

As another example, EDAX method can be used to calculate the contact percentage. EDAX, sometimes referred to as EDS, is an x-ray spectroscopic method for determining elemental compositions. EDAX can be used in conjunction with imaging in SEM on an SEM instrument. For example, a silica (friction adjusting particles 22) to carbon (fibers 20) ratio is measured via EDAX. To measure the contact percentage with EDAX, a standard curve between contact percentage of particles on fiber and the ratio is established.

As yet another example, XRF can also be indirectly used to measure the contact percentage. Standard curves between an imaging method obtained contact percentage and an XRF account are established. After the XRF account is measured for the surface area of the fibers 20 occupied by the friction adjusting particles 22, the contact percentage can be obtained through standard curve.

Figure 1A:
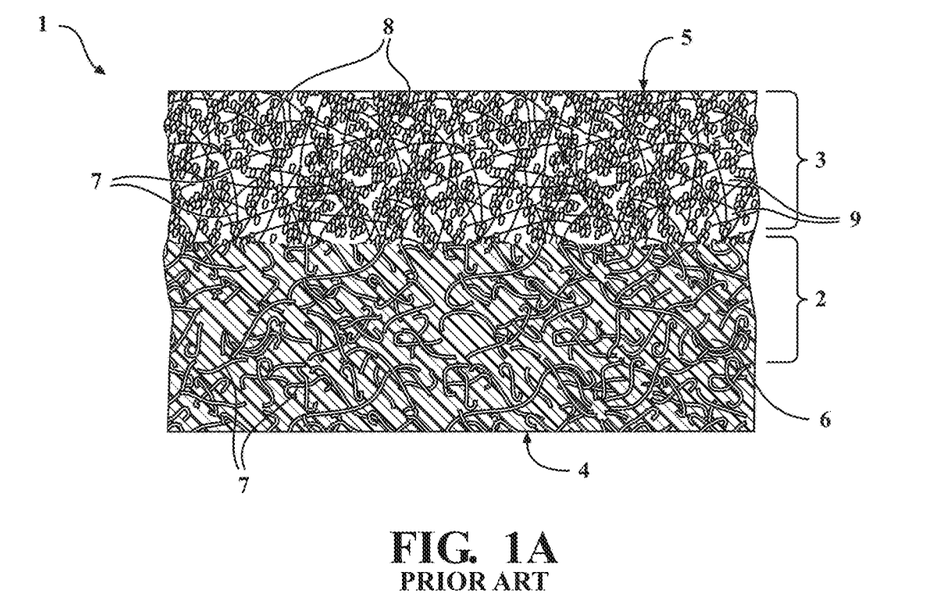
FIG. 1A is an enlarged cross-sectional view of a friction material including a porous friction generating layer and a base of the prior art.
Figure 1B:
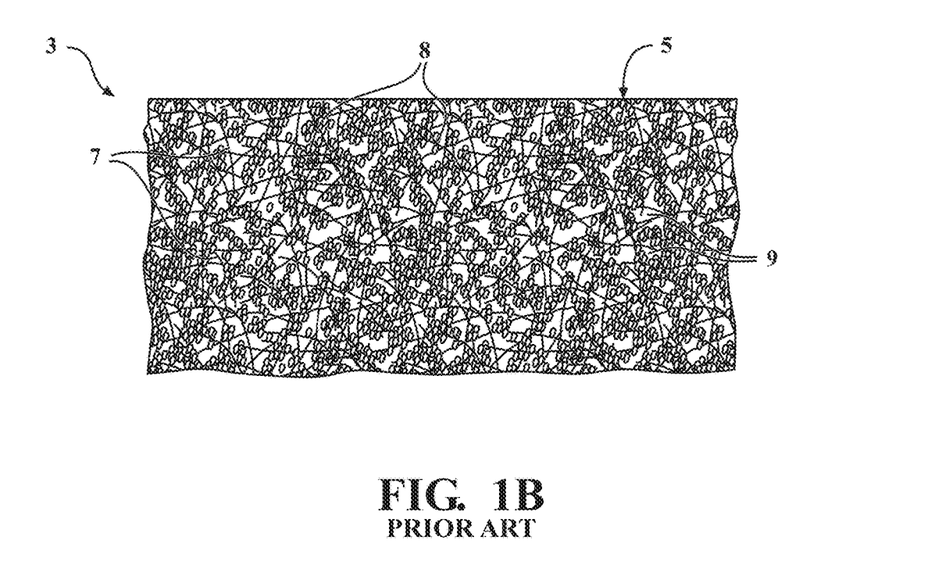
FIG. 1B is an enlarged, isolated cross-sectional view of the porous friction generating layer of the friction material of FIG. 1A.
Figure 3B:
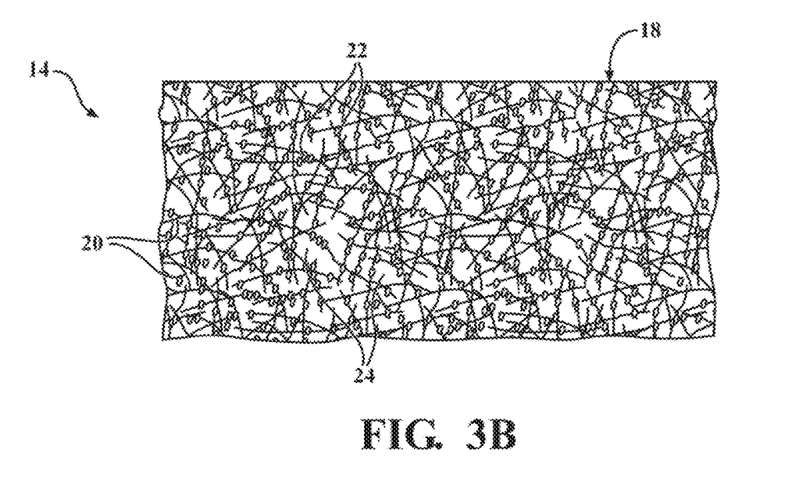
FIG. 3B is an enlarged, isolated cross-sectional view of the porous friction generating layer of the friction material of FIG. 3A.

As such, the plurality of pores 24 which are defined by the porous friction generating layer 14 of the subject disclosure are typically larger than the pores defined by a porous friction generating layer which does include fibers which are in contact with friction adjusting particles as is defined above (via a contact % of the surface area of the fibers). To this end, FIG. 3B is a cross-sectional view of a porous friction generating layer 14 of the subject disclosure which includes the plurality of pores 24. The porous friction generating layer 14 of 1B has a smaller average pore size than the friction generating layer 14 of FIG. 3B. Because from about 30 to about 95% of the surface area of the fibers 20 in the porous friction generating layer 14 of the subject disclosure are in contact with the friction adjusting particles 22, the porous friction generating layer 14 has the plurality of pores 24 having an increased average pore size.

In contrast to FIGS. 3A and 3B, FIGS. 1A and 1B illustrate friction material 1 of the prior art which comprises a base 2 and a friction generating layer 3. The base 2 presents a bonding surface 4. The porous friction generating layer 3 presents a friction generating surface 5 facing opposite (and parallel to) the bonding surface 4 of the base 2. The friction material includes curable resin 6, fibers 7, and particles 8. The random arrangement of the fibers 7 and particles 8 defines a plurality of smaller, random pores 9.

Figure 2:
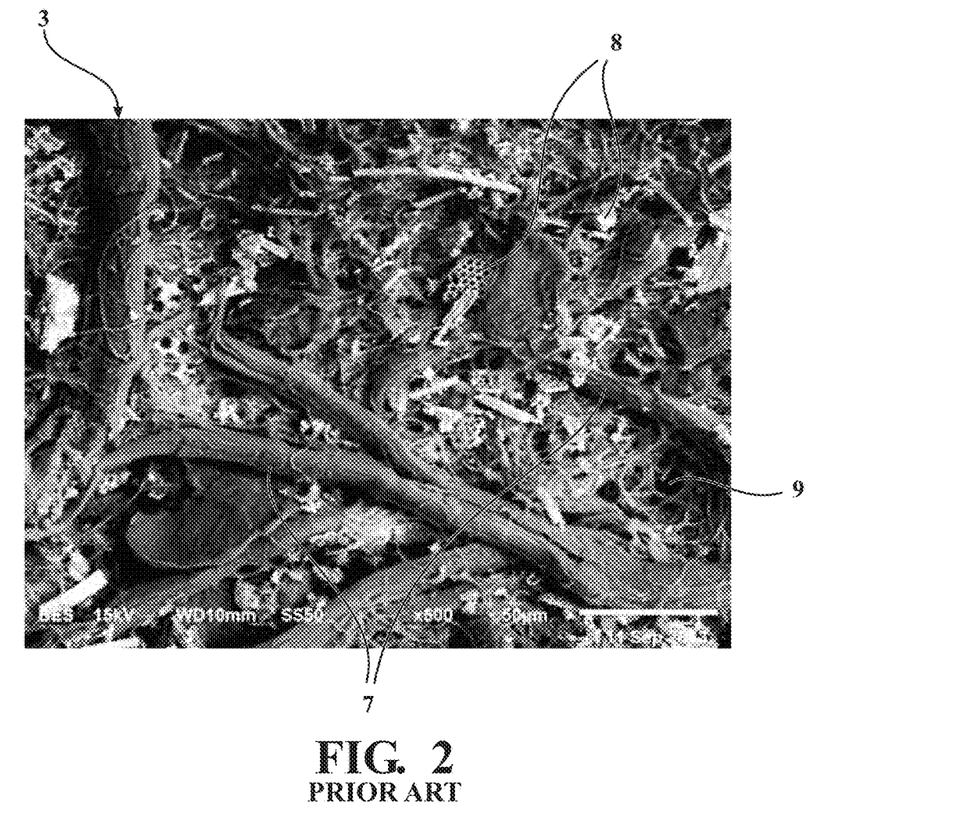
FIG. 2 is a top-view scanning electron microscope ("SEM") image of a porous friction generating layer of a friction material of the prior art.
Figure 4:
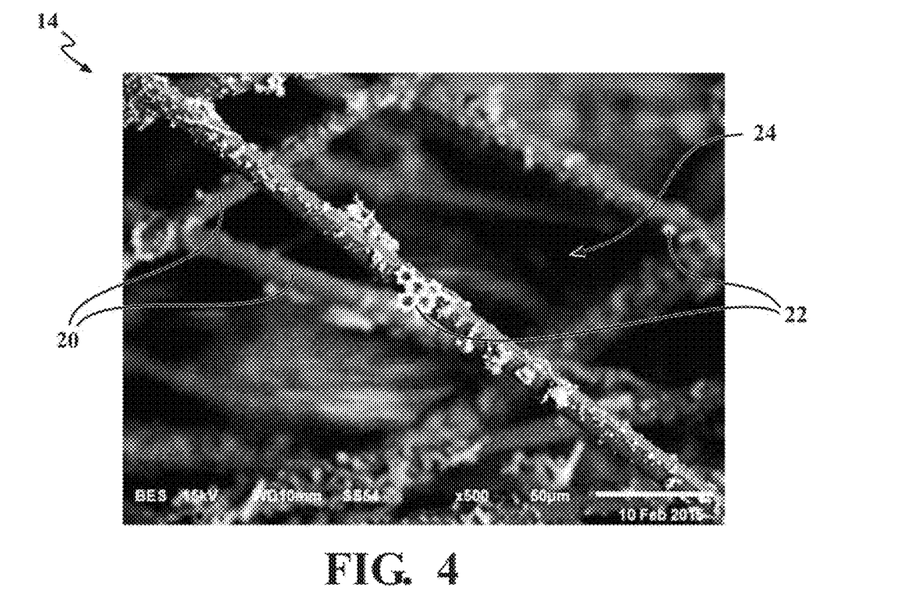
FIG. 4 is a top-view SEM image of a porous friction generating layer of a friction material.
Figure 5:
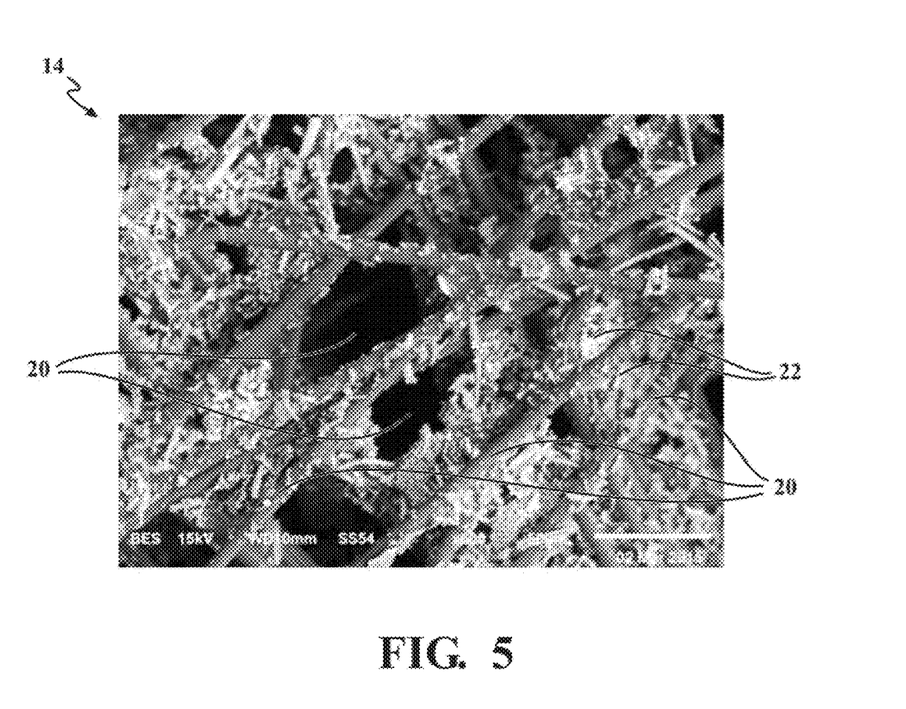
FIG. 5 is another top-view scanning electron microscope SEM image of a porous friction generating layer of a friction material.

FIGS. 4 and 5 show top-view scanning electron microscope (SEM) images of a porous friction generating layer 14 of a friction material 10 wherein the friction adjusting particles 22 are in contact with a surface of the fibers 20. In FIGS. 4 and 5, it is apparent that the friction adjusting particles 22 are in contact with the surface of the fibers 20 and that the plurality of pores 24 of the porous friction generating layer 14 have a larger average pore size than a random arrangement of friction adjusting particles 22 and fibers 20 such as that shown in FIG. 2, which is a top-view SEM image of a porous friction generating layer 3 of a friction material 1 of the prior art wherein fiber 7 and particles 8 are arranged randomly. In the subject disclosure, the arrangement of those two components (the fibers 20 and the friction adjusting particles 22) provides a friction material 10 with excellent dynamic and static coefficient of friction ("COF").

In various embodiments, the porous friction generating layer 14 defines the plurality of pores 24 having an average pore size of from about 5 to about 100 μm, alternatively of from about 10 to about 80 μm. Pore volume, average pore size/pore size distribution, and porosity is typically measured in accordance with ASTM D4404-10 (with a mercury intrusion method which uses pressurized mercury to penetrate into friction material).

Without being bound by theory, it is believed that the increased pore size of the porous friction generating layer 14 allows for increased lubricant flow through the friction material 10 in wet clutch applications; this increased lubricant flow provides the friction material 10 with improved performance properties.

In various embodiments, the porous friction generating layer 14 has a density of from about 0.4 to about 0.9 g/cm$^3$, alternatively from about 0.4 to about 0.8 g/cm$^3$. The porous friction generating layer 14 of the subject disclosure may have the same density as a comparative friction generating layer, but because the friction adjusting particles 22 of the subject disclosure are in contact with the fiber 20 of the subject disclosure, the porous friction generating layer 14 of the subject disclosure has an increased average pore size.

As is set forth above, the porous friction generating layer 14 comprises friction adjusting particles 22. Various suitable friction adjusting particles 22 comprise, consist essentially of, or consist of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, or combinations thereof. As used herein, "consists essentially of" is used to describe embodiments that include the specified components (e.g. friction adjusting particles 22) which are free of, or substantially free of (e.g. includes less than 5 wt. %, less than 1 wt. %, less than 0.1 wt. %), other compounds and additives.

Alternatively, the friction adjusting particles 22 are selected from silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, and combinations thereof.

In various embodiments, the friction adjusting particles 22 comprise diatomaceous earth. Diatomaceous earth is a mineral comprising silica. Diatomaceous earth is an inexpensive, abrasive material that exhibits a relatively high coefficient of friction which readily disperses throughout the fibers 20 of the porous friction generating layer 14. Of course, all of the friction adjusting particles 22 included in the porous friction generating layer 14 may be diatomaceous earth or, alternatively, the friction adjusting particles 22 may include a combination of different types of the friction adjusting particles 22, such as various combinations of diatomaceous earth, carbon, graphite, and alumina. The type or types of the friction adjusting particles 22 included in the porous friction generating layer 14 may vary depending on the friction characteristics sought at the friction generating surface 18 of the friction material 10.

In various embodiments, the friction adjusting particles 22 have an average diameter of from about 0.04 μm to about 40 μm, alternatively from about 1 μm to about 20 μm. Further, in various embodiments, the friction adjusting particles 22 have a thermal stability of about 400° C. or greater, alternatively about 450° C. or greater, alternatively about 500° C. or greater. By thermal stability it is meant that the friction adjusting particles 22 do not melt, soften, or decompose. The thermal stability of the friction adjusting particles 22 is typically determined by thermal gravimetric analysis ("TGA"). The temperature at which a test sample of the friction adjusting particles 22 analyzed via TGA loses 10 wt. % based on a total weight of the test sample is the temperature at which the friction adjusting particles 22 lose thermal stability.

In various embodiments, the friction adjusting particles 22 comprise particles derived from cashew nut shell oil, rubber, or combinations thereof. Friction adjusting particles 22 derived from cashew nut shell oil or comprising rubber are elastic and exhibit rubber-like properties. In this disclosure, particles derived from cashew nut shell oil and/or rubber are referred to as elastomeric particles.

In some embodiments, the friction adjusting particles 22 are rubber particles comprising, consisting essentially of, or consisting of, silicone rubber, styrene butadiene rubber ("SBR"), butyl rubber, and halogenated rubbers such as chlorobutyl rubber, bromobutyl rubber, polychloroprene rubber, nitrile rubber, or combinations thereof.

In various embodiments, the elastomeric particles have average diameters of less than about 40 μm, alternatively from about 2 μm to about 40 μm, alternatively from about 5 μm to about 30 μm, alternatively from about 5 μm to about 15 μm. Advantageously, elastomeric particles of the porous friction generating layer 14 having an average diameter of less than about 40 μm typically improve the compression of the porous friction generating layer 14 and, importantly, when used in combination with other friction adjusting particles 22 and the fibers 20 unexpectedly yield a friction generating surface 18 having an improved static COF. Without being bound by theory, it is believed that the elasticity and relative lack of rigidity provided by the such elastomeric particles provides a cushioning effect upon compression of the friction generating surface 18 of the friction material 10 which evenly distributes pressures at elevated temperature and, thus, improves the static COF of the friction generating surface 18 without negatively effecting the dynamic COF of the friction generating surface 18.

In various embodiments, the elastomeric particles have a thermal stability of about 200° C. or greater, alternatively about 250° C., alternatively about 300° C. or greater, alternatively about 350° C. or greater. By thermal stability it is meant that the elastomeric particles do not melt, soften, or decompose. The thermal stability of the elastomeric particles is typically determined by TGA. The temperature at which a test sample of the elastomeric particles analyzed via TGA loses 10 wt. % based on a total weight of the test sample is the temperature at which the elastomeric particles lose thermal stability.

The friction adjusting particles 22 are typically present in the porous friction generating layer 14 in an amount of from about 10 to about 40 lbs per 3000 ft$^2$ of the friction generating surface 18, alternatively from about 15 to about 35 lbs per 3000 ft$^2$ of the friction generating surface 18. The amount of the friction adjusting particles 22 present in the porous friction generating layer 14 may vary outside of the ranges above, but is typically both whole and fractional values within these ranges. Further, it is to be appreciated that more than one type of the friction adjusting particles 22 may be included in the porous friction generating layer 14, in which case the total amount of all the friction adjusting particles 22 present in the porous friction generating layer 14 is within the above ranges.

The friction adjusting particles 22 are typically present in the friction material 10 in an amount of from about 10 to about 100 lbs per 3000 ft$^2$ of the friction generating surface 18, alternatively from about 15 to about 80 lbs per 3000 ft$^2$ of the friction generating surface 18. The amount of the friction adjusting particles 22 present in the friction material 10 may vary outside of the ranges above, but is typically both whole and fractional values within these ranges. Further, it is to be appreciated that more than one type of the friction adjusting particles 22 may be included in the friction material 10, in which case the total amount of all the friction adjusting particles 22 present in the friction material 10 is within the above ranges.

In one embodiment, the friction material 10 is a single layer friction material and the friction adjusting particles 22 are typically present in the friction material 10 in an amount of from about 10 to about 100 lbs per 3000 ft$^2$ of the friction generating surface 18, alternatively from about 15 to about 80 lbs per 3000 ft$^2$ of the friction generating surface 18. The amount of the friction adjusting particles 22 present in the friction material 10 may vary outside of the ranges above, but is typically both whole and fractional values within these ranges. Further, it is to be appreciated that more than one type of the friction adjusting particles 22 may be included in the friction material 10, in which case the total amount of all the friction adjusting particles 22 present in the friction material 10 is within the above ranges.

Notably, the amount of the components in the porous friction generating layer 14 provided herein are in units of pounds per 3000 ft$^2$, such units are customarily used in the paper making industry as a measurement of weight based on a given surface area of a thin layer, whether impregnated with the curable resin 26 or not.

Referring now to the fibers 20 of the porous friction generating layer 14, the fibers 20 comprise, consist essentially of, or consist of, cellulose fibers, aramid fibers, acrylic fibers, carbon fibers, or combinations thereof. Alternatively, the fibers 20 are selected from cellulose fibers, aramid fibers, acrylic fibers, carbon fibers, and combinations thereof.

In one embodiment, the fibers 20 of the porous friction generating layer 14, consist essentially of or consist of aramid fibers. In another embodiment, the fibers 20 of the porous friction generating layer 14, consist essentially of or consist of aramid and cellulose (e.g. cotton) fibers.

In a typical embodiment, the fibers 20 comprise cellulose. For example, in various embodiments the fibers 20 comprise natural cellulose, regenerated cellulose, a cellulose derivative, or a mixture thereof. In some embodiments, the fibers 20 comprise at least 50 wt. %, alternatively at least 60 wt. %, alternatively at least 70 wt. %, alternatively at least 80 wt. %, alternatively at least 90 wt. %, alternatively at least 99 wt. %, alternatively about 100 wt. %, of natural cellulose, regenerated cellulose, a cellulose derivative, or a mixture thereof. In various embodiments, the fibers 20 consist essentially of, or consist of, cellulose. In some embodiments, the fibers 20 comprise, consist essentially of, or consist of natural cellulose. In other embodiments, the fibers 20 comprise, consist essentially of, or consist of, regenerated cellulose. For example, in such other embodiments, the fibers 20 comprise, consist essentially of, or consist of, regenerated lyocell cellulose.

Natural cellulose is a straight chain polysaccharide that includes repeating β(1→4)-glycosidic-linked glucose units and which has the general polymeric formula $(C_6H_1O_5)_n$ with the number of repeating units ("n") usually ranging from 100 to 10,000. Regenerated cellulose has the same chemical formula as natural cellulose and is prepared from naturally-occurring polymers (e.g. wood pulp or bamboo) from one of several processes including the viscose process, the cuprammonium process, and an organic solvent spinning process. Some examples of regenerated cellulose are rayon, modal, and lyocell. A cellulose derivative is a modified cellulose in which the hydroxyl group on the glucose units is fully or partially substituted with, for example, an ester group. Some examples of a cellulose derivative are cellulose acetate and cellulose triacetate.

In some embodiments, the fibers 20 comprise aramid. For example, in various embodiments the aramid is synthetic aromatic polyamide. One such example of aromatic polyamide is para-aramid, such as the condensation product of 1,4-phenylene-diamine and terephthaloyl chloride. Another such example of aromatic polyamide is meta-aramid, such as the condensation product of m-phenylenediamine and isophthaloyl chloride.

In one embodiment, the friction material 10 comprises aramid fibers only. That is, the fibers 20 (excluding the paper) included in the friction material 10 comprises, consists essentially of, or consists of aramid fibers.

In some embodiments, the fibers 20 comprise acrylic. For example, in various embodiments, the acrylic is a synthetic acrylic polymer formed from at least 85 wt. % acrylonitrile monomers.

In some embodiments, the fibers 20 comprise carbon. In certain embodiments, the presence of carbon fibers aids in increasing thermal resistance, maintaining a steady coefficient of friction and increasing the squeal resistance. Carbon fibers can provide good heat conduction such that the friction material 10 has a desired heat resistance. In other embodiments, the use of aramid fibers and carbon fibers improves the ability of the friction material 10 to withstand high temperatures.

In various embodiments, the fibers 20 have average diameters of from about 1 to about 500, alternatively from about 2 to about 80, alternatively from about 2 to about 60, μm, and average lengths of from about 1 to about 10, alternatively from about 2 to about 8, alternatively from about 4 to about 6, mm. In such embodiments, the fibers 20 typically have a degree of fibrillation as measured according to Canadian Standard Freeness ("C SF") of from about 5 to about 650, alternatively from about 5 to about 300, alternatively from about 10 to about 200, alternatively from about 10 to about 100, ml CSF. In some embodiments, the friction material 10 is a single layer friction material and the fibers 20 have a degree of fibrillation of from about 5 to about 10, ml CSF. CSF is an empirical test procedure that measures the rate at which 3 grams of a fibrous pulp material in 1 liter of water may be drained. CSF measurements are conducted in accordance with the TAPPI T227 test procedure. In making CSF measurements, it is noted that a more fibrillated fibrous pulp material will have a lower water drainage rate and, thus, a lower "ml CSF" value, and that a less fibrillated fibrous pulp material will have a higher "ml CSF" value.

Further, in various embodiments, the fibers 20 have a thermal stability of about 200° C. or greater, alternatively 250° C. or greater, alternatively 350° C. or greater. By thermal stability it is meant that the fibers 20 do not melt, soften, or decompose. The thermal stability of the fibers 20 is typically determined by TGA. The temperature at which a test sample of the elastomeric particles analyzed via TGA loses 10 wt. % based on a total weight of the test sample is the temperature at which the elastomeric particles lose thermal stability.

The fibers 20 are typically present in the porous friction generating layer 14 in an amount of from about 1 to about 6, alternatively from about 2 to about 5, alternatively from about 2 to about 4, alternatively about 3, lbs per 3000 ft$^2$ of the friction generating surface 18. The amount of the fibers 20 present in the porous friction generating layer 14 may vary outside of the ranges above, but is typically both whole and fractional values within these ranges. Further, it is to be appreciated that more than one type of the fibers may be included in the porous friction generating layer 14, in which case the total amount of all the fibers 20 present in the porous friction generating layer 14 is within the above ranges.

The fibers 20 are typically present in the friction material 10 in an amount of from about 1 to about 200, alternatively from about 2 to about 150, lbs per 3000 ft$^2$ of the friction generating surface 18. The amount of the fibers 20 present in the friction material 10 may vary outside of the ranges above, but is typically both whole and fractional values within these ranges. Further, it is to be appreciated that more than one type of the fibers may be included in the friction material 10, in which case the total amount of all the fibers 20 present in the friction material 10 is within the above ranges.

In one embodiment, the friction material 10 is a single layer friction material and the fibers 20 are typically present in the friction material 10 in an amount of from about 1 to about 200, alternatively from about 2 to about 150, lbs per 3000 ft$^2$ of the friction generating surface 18. The amount of the fibers 20 present in the friction material 10 may vary outside of the ranges above, but is typically both whole and fractional values within these ranges. Further, it is to be appreciated that more than one type of the fibers may be included in the friction material 10, in which case the total amount of all the fibers 20 present in the friction material 10 is within the above ranges.

The amounts of the fibers 20 and the friction adjusting particles 22 can be chosen to affect the frictional characteristics of the friction material 10. The porosity of the friction material 10 at the friction generating surface 18, for instance, is inversely proportional to the amount of the fibers 20 present in the porous friction generating layer 14. The amount of the friction adjusting particles 22 present in the porous friction generating layer 14 influences both the static and dynamic coefficient of friction that can be achieved at the friction generating surface 18. Although a higher coefficient of friction generally accompanies a higher amount of friction adjusting particles 22 and vice versa, use of the friction adjusting particles 22 and the fibers 20 alone does not allow for significant improvement of the static coefficient of friction of the friction material 10. Advantageously, the arrangement of those two components (the fibers 20 and the friction adjusting particles 22) provides a friction material 10 with excellent dynamic and static COF.

Referring now to the base 12 of the friction material 10, the base 12 typically comprises paper, various structural fibers 28, and fillers. When the friction material 10 is a single layer friction material 10, the friction material 10 can include any of the paper, various structural fibers 28, and fillers set forth below which are described as included in the base 12.

In a preferred embodiment, the base 12 comprises the structural fibers 28 which penetrate into the porous friction generating layer 14 and intermingle with the fibers 20. To this end, the base can be referred to as indiscreet, just like the porous friction generating layer 14. In some embodiments, the structural fibers 28 of the base 12 are exposed at the friction generating surface 18. In other embodiments, the structural fibers 28 of the base 12 are not exposed at the friction generating surface 18.

The structural fibers 28 are typically selected from cellulose fibers, aramid fibers, acrylic fibers, glass fibers, ceramic fibers, novoloid (phenol-formaldehyde) fibers, carbon fibers, mineral fibers, and combinations thereof. The various types of cellulose, aramid, and acrylic fibers are just as described above in reference to the fibers 20 of the porous friction generating layer 14. Carbon fibers, sometimes referred to as graphite fibers, are fibers comprising carbon atoms. Of course, carbon fibers as discussed herein include fibers formed with carbon and other materials, i.e., composite carbon fibers.

In various embodiments, the structural fibers 28 have average diameters of from about 1 to about 500, alternatively from about 1 to about 300, alternatively from about 1 to about 80, μm, and average lengths of from about 2 to about 20, alternatively from about 4 to about 18, alternatively from about 6 to about 16, mm. In such embodiments, the structural fibers 28 typically have a degree of fibrillation as measured according to CSF of from about 100 to about 1000, alternatively from about 100 to about 800, alternatively from about 100 to about 650, alternatively from about 100 to about 650, ml CSF.

In one embodiment, the base 12 includes fibrillated micro structural fibers 28 comprising aramid such as poly-para-phenylene terephthalamide. In another embodiment, the base 12 includes structural fibers 28 comprising cellulose. In another embodiment, the base 12 includes structural fibers 28 comprising carbon. In a preferred embodiment, the base 12 includes individual structural fibers 28 comprising, consisting of, or consisting essentially of aramid and cellulose. The combination of these two types of microfibers provides the base 12 with thermal and chemical stability and a high fatigue resistance well above 350° C. The aramid and cellulose structural fibers present in the base 12 of this embodiment may be natural or synthetic.

The structural fibers 28 are typically present in the friction material 10 in an amount of from about 10 to about 90 wt. %, alternatively from about 20 to about 70 wt. %, based on the total weight of the base 12. The amount of the structural fibers 28 present in the base 12 may vary outside of the ranges above, but is typically both whole and fractional values within these ranges. Further, it is to be appreciated that more than one type of the structural fibers 28 may be included in the base 12, in which case the total amount of all the structural fibers 28 present in the base 12 is within the above ranges.

Referring now to the fillers of the base 12, the fillers are selected from particles and/or fibers of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, diatomaceous earth, cashew nut particles, and combinations thereof. In a preferred embodiment, the filler of the base 12 includes a combination of diatomaceous earth and carbon.

The filler is typically present in the friction material 10 in an amount of from about 20 to about 80 wt. %, alternatively from about 20 to about 60 wt. %, based on the total weight of the base 12. The amount of the filler present in the base 12 may vary outside of the ranges above, but is typically both whole and fractional values within these ranges. Further, it is to be appreciated that more than one type of the filler may be included in the base 12, in which case the total amount of all the fillers present in the base 12 is within the above ranges.

Referring now to the curable resin 26 that is dispersed throughout the porous friction generating layer 14 and the base 12 of the friction material 10. The curable resin 26 may be any thermosetting resin suitable for providing structural strength to the friction material 10. The curable resin 26 may, for example, be a phenolic resin or a modified phenolic resin (e.g. an epoxy phenolic, etc.) A phenolic resin is a class of thermosetting resins that is produced by the condensation of an aromatic alcohol, typically a phenol, and an aldehyde, typically a formaldehyde. A phenolic-based resin is a thermosetting resin blend that includes at least 50 wt. % of a phenolic resin based on the total weight of all resins and excluding any solvents or processing acids. Some examples of other thermosetting resins that may be blended with a phenolic resin include silicone resins, epoxy resins, and polybutadiene resins, to name but a few examples. Once cured, the curable resin 26 is referred to as the cured resin 34, the cured resin 34 confers strength and durability to the friction material 10 and adheres to the fibers 20 and the friction adjusting particles 22 in the porous friction generating layer 14 while maintaining a desired porosity for proper lubricant flow and retention.

The curable resin 26 is typically present in the friction material 10 in an amount of less than about 75, alternatively less than about 60, alternatively less than about 55, alternatively less than about 45, alternatively less than about 40, alternatively less than about 40, alternatively from about 40 to about 55, alternatively from about 20 to about 35, alternatively from about 25 wt. % to about 30 wt. %, based on 100 parts by weight of the friction material 10. Alternatively, a ratio of the curable resin 26 to all other components (e.g. fibers, particles, etc.) in the friction material is from about 5:1 to about 1:5, alternatively from about 3:1 to about 1:3, alternatively from about 2:1 to about 1:2.

Figure 6:
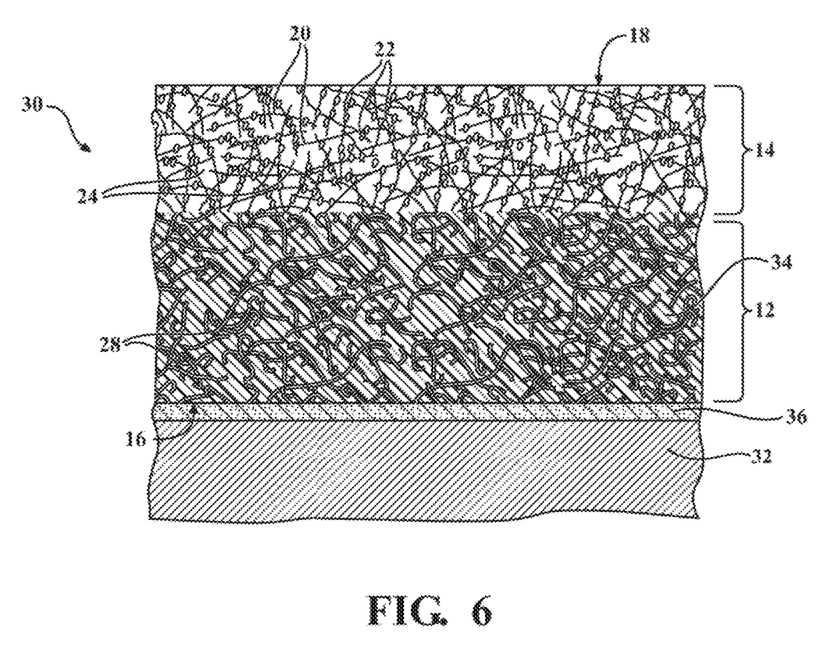
FIG. 6 is an enlarged cross-sectional view of a friction plate including the friction material of FIG. 3 and a substrate.

Referring now to FIG. 6, the friction plate 30 comprises the friction material 10, which is cured (i.e. comprising cured resin 34) bonded to a substrate 32 with a bonding adhesive 36. The bonding surface 16 is the surface of the friction material 10 where bonding to the substrate 32 or other material is meant to be accomplished. As such, the bonding surface 16 of the base 12 is bonded to a substrate 32.

The friction material 10 is bonded to the substrate 32 by any suitable technique known to skilled artisans. Typically, the friction material 10 is bonded to the substrate 32 with the bonding adhesive 36, which is generally known to those skilled art, e.g. with a bonding adhesive 36 comprising phenolic modified nitrile rubber. Exemplary substrates 32 include, but are not limited to, friction/clutch plates, synchronizer rings, and transmission bands. The substrate 32 is typically metal.

A method of forming the porous friction generating material 10 is also disclosed herein. In a first embodiment, the method includes the steps of (1) impregnating a base paper with the curable resin 26, (2) dispersing the fibers 20 and the friction adjusting particles 22 onto the base paper, and (3) curing the porous friction generating material 10.

In a second embodiment, the method includes the steps of (1) mixing the friction adjusting particles 22 and the curable resin 26 to form resin 26 coated particles 22, (2) mixing the resin 26 coated particles 22 and the fibers 20 to bond the friction adjusting particles 22 to the fibers 20 such that the fibers 20 are in contact with the friction adjusting particles 22, (3) dispersing the fibers 20 which are in contact with the friction adjusting particles 22 onto the base paper, and (4) curing the porous friction generating material 10. Of course, embodiments where the fibers 20 and the resin 26 coated particles 22 are dispersed onto the base paper in two distinct steps are also contemplated herein.

In a third embodiment, the method includes the steps of (1) mixing the fibers 20 and the curable resin 26 to form resin 26 coated fibers 20, (2) mixing the resin 26 coated fibers 20 and the friction adjusting particles 22 to bind the friction adjusting particles 22 to the resin 26 coated fibers 20 such that the fibers 20 are in contact with the friction adjusting particles 22, (3) dispersing the fibers 20 which are in contact with the friction adjusting particles 22 onto the base paper, and (4) curing the porous friction generating material 10. Of course, embodiments where the resin 26 coated fibers 20, and the friction adjusting particles 22 are dispersed onto the base paper in two distinct steps are also contemplated herein.

In a fourth embodiment, the porous friction generating material 10 is a single material, i.e., does not have a distinct base layer and a friction generating layer. To this end, the method includes the steps of (1) mixing the friction adjusting particles 22 and the curable resin 26 to form resin 26 coated particles 22, (2) saturating the base paper with the above mixture, and (3) curing the porous friction generating material 10.

As alluded to above, the various embodiments of the friction material 10 described herein may be used in a wet clutch. The friction generating surface 18 of the friction material 10 experiences interfacial frictional engagement with an opposed mating surface (not shown) in the presence of a lubricant. The friction generating surface 18 experiences select interfacial frictional engagement with an opposed, rotating surface (not shown) in the presence of a lubricant, and the bonding surface 16 achieves bonded attachment to the substrate 32 with the aid of an adhesive or some other suitable bonding technique. The lubricant may be any suitable lubricating fluid such as, for example, an automatic transmission fluid. While the friction material 10 performs satisfactorily above about 350° C., alternatively about 400° C., alternatively about 450° C., it is not limited only to such high-temperature environments and may, if desired, be used in a wet clutch designed to maintain a temperature at the friction generating surface 18 below 350° C.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A friction material comprising:
   (A) a base presenting a bonding surface;
   (B) a porous friction generating layer penetrating into said base, compositionally different than said base, and presenting a friction generating surface facing opposite said bonding surface of said base, said porous friction generating layer comprising:
      (i) fibers, and
      (ii) friction adjusting particles,
      wherein from about 30 to about 95% of a total surface area of said fibers is in contact with said friction adjusting particles; and
   (C) a curable resin dispersed throughout said porous friction generating layer and said base;
   wherein said friction material has a thickness defined as a distance between said friction generating surface and said bonding surface and said porous friction generating layer extends from said friction generating surface towards said bonding surface up to about 40% of said thickness.

2. A friction material as set forth in claim 1 wherein from about 30 to about 90% of said total surface area of said fibers is in contact with said friction adjusting particles.

3. A friction material as set forth in claim 1 wherein said porous friction generating layer has an average pore size of from about 5 to about 100 µm.

4. A friction material as set forth in claim 1 wherein said porous friction generating layer has a density of from about 0.4 to about 0.9 g/cm$^3$.

5. A friction material as set forth in claim 1 wherein said friction adjusting particles are selected from silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, and combinations thereof.

6. A friction material as set forth in claim 1 wherein said friction adjusting particles comprise diatomaceous earth having an average diameter of from about 0.1 µm to about 30 µm and a Mohs hardness of from about 3 to about 9.

7. A friction material as set forth in claim 6 wherein said friction adjusting particles further comprise particles derived from cashew nut shell oil, rubber, or a combination thereof having a compressibility of from about 1.5 to about 7.5% when tested in accordance with ISO 6310.

8. A friction material as set forth in claim 1 wherein said friction adjusting particles are present in said friction material in an amount of from about 10 to about 100 lbs per 3000 ft$^2$ of said friction generating surface.

9. A friction material as set forth in claim 1 wherein said fibers are selected from cellulose fibers, aramid fibers, acrylic fibers, carbon fibers, and combinations thereof, and/or wherein said fibers have an average diameter of from about 1 µm to about 500 µm and an average length of from about 2 mm to about 20 mm.

10. A friction material as set forth in claim 1 wherein said fibers are present in said friction material in an amount of from about 1 to about 200 lbs per 3000 ft$^2$ (about 0.5 kg to about 2.7 kg per 278.7 m$^2$) of said friction generating surface.

11. A friction material as set forth in claim 1 wherein said base comprises structural fibers which penetrate into said porous friction generating layer and intermingle with said fibers.

12. A friction material as set forth in claim 1 wherein said curable resin is a phenolic resin and/or a modified phenolic resin.

13. A friction plate comprising a friction material as set forth in claim 1 which is cured, wherein said bonding surface of said base of said cured friction material is bonded to a substrate.

14. A wet clutch assembly comprising said friction plate of claim 13 and a separator plate.

* * * * *